US011214694B2

(12) United States Patent
Thomas et al.

(10) Patent No.: US 11,214,694 B2
(45) Date of Patent: Jan. 4, 2022

(54) MULTI-COLOR PAINT: DIY EASY ROLLER APPLICATION FORMULATION BY THIXOTROPIC RESINS IN CONTINUOUS PHASE

(71) Applicant: BEHR PROCESS CORPORATION, Santa Ana, CA (US)

(72) Inventors: James Thomas, Santa Ana, CA (US); Joshua Jiang, Santa Ana, CA (US); Jens Hentschel, Westminster, CA (US); Ming-Ren Tarng, Irvine, CA (US); Lan Duc Liang, Garden Grove, CA (US)

(73) Assignee: Behr Process Corporation, Santa Ana, CA (US)

( * ) Notice: Subject to any disclaimer, the term of this patent is extended or adjusted under 35 U.S.C. 154(b) by 112 days.

(21) Appl. No.: 15/679,684

(22) Filed: Aug. 17, 2017

(65) Prior Publication Data

US 2019/0055417 A1   Feb. 21, 2019

(51) Int. Cl.
| | |
|---|---|
| C09D 5/29 | (2006.01) |
| C09D 7/65 | (2018.01) |
| C09D 7/43 | (2018.01) |
| C09D 7/44 | (2018.01) |
| C09D 133/04 | (2006.01) |
| C08K 5/17 | (2006.01) |
| C08K 3/34 | (2006.01) |

(52) U.S. Cl.
CPC ............ C09D 5/29 (2013.01); C09D 7/43 (2018.01); C09D 7/44 (2018.01); C09D 7/65 (2018.01); C09D 133/04 (2013.01); C08K 3/34 (2013.01); C08K 5/17 (2013.01)

(58) Field of Classification Search
CPC .......... C09D 5/29; C09D 133/04; C09D 7/43; C09D 7/44; C09D 7/65
See application file for complete search history.

(56) References Cited

U.S. PATENT DOCUMENTS

| | | | |
|---|---|---|---|
| 3,058,931 A | 10/1962 | Petty | |
| 3,811,904 A | 5/1974 | Zola | |
| 4,009,136 A | 2/1977 | Lewandowski et al. | |
| 4,376,654 A | 3/1983 | Zola | |
| 4,684,704 A | 8/1987 | Craig | |
| 5,114,481 A * | 5/1992 | Lynch | C09D 5/29 106/196.1 |
| 5,114,484 A * | 5/1992 | Lynch | C09D 5/29 106/197.01 |
| 5,114,485 A * | 5/1992 | Lynch | C09D 5/29 106/162.82 |
| 5,123,963 A * | 6/1992 | Rossetti | C09D 5/29 106/15.05 |
| 5,340,389 A | 8/1994 | Bollini | |
| 5,480,480 A * | 1/1996 | Lynch | C09D 5/29 106/181.1 |
| 6,005,031 A * | 12/1999 | Bremer-Masseus | C09D 7/80 524/55 |
| 7,569,636 B2 | 8/2009 | Tennebroek et al. | |
| 9,499,680 B2 | 11/2016 | Yang et al. | |
| 9,809,718 B1* | 11/2017 | Shah | C09D 5/29 |
| 2003/0073776 A1 | 4/2003 | Cho et al. | |
| 2004/0225051 A1* | 11/2004 | Moy | C08G 18/72 524/501 |
| 2015/0148457 A1* | 5/2015 | Yun | C09D 17/002 524/18 |
| 2015/0183265 A1 | 7/2015 | Xiong et al. | |
| 2017/0335133 A1* | 11/2017 | Zhang | C09D 133/08 |
| 2019/0055417 A1* | 2/2019 | Thomas | C09D 7/65 |

FOREIGN PATENT DOCUMENTS

| | | |
|---|---|---|
| GB | 2078243 B | 1/1982 |
| JP | 2007262350 A | 10/2007 |
| WO | 2012147693 | 11/2012 |
| WO | 2016078020 A1 | 5/2016 |
| WO | WO 2016/078020 A1 * | 5/2016 |

OTHER PUBLICATIONS

Ramos, A.M. et al., "Preparation and Characterization of Cellulose Nanocomposite Hydrogels as Functional Electrolytes," Solid State Ionics, 242 (2013), pp. 26-32.
Scott Bader (www.scottbader.com), Thickeners & Rheology Guide, 7 pgs.
The Dow Chemical Company, Safety Data Sheet, Product name: RHOPLEX AC-2508 Acrylic Emulsion, issued 2016, 10 pgs.
DSM, Advanced Polymer Technologies for Decorative Coatings, 2011, 7 pgs.
Angos, C. A Guide to Understanding and Mixing Thickeners, Charles Ross & Son Company, 8 pgs.
Rohm and Haas, Acrysol TT-935 Rheology Modifier, 2005, 4 pgs.
Willenbacher, N., "Unusual Thixotropic Properties of Aqueous Dispersions of Laponite RD," J. of Colloid and Interface Science 182, 1996, pp. 501-510.
Arkema Innovative Chemistry, "ENCOR 657, Versatile High Solids 100% Acrylic Latex for Interior, Exterior and Masonry Coatings," Arkema Coating Resins, 2015, 7 pgs.
BYK-CHEMIE GmbH, LAPONITE S482, Product Data, 2014, 1 pg.
Ashland, "NATROSOL 250, Water Soluble Hydroxyethylcellulose," Product Data, No. 4739-1, 2015, 2 pgs.

(Continued)

*Primary Examiner* — Michael A Salvitti
(74) *Attorney, Agent, or Firm* — Brooks Kushman P.C.

(57) ABSTRACT

A multicolor paint composition includes a continuous phase having a first rheology modifier and an optional second rheology modifier, a first discontinuous phase dispersed in the continuous phase, and a second discontinuous phase immiscibly dispersed in the continuous phase. The first discontinuous phase includes a first colorant having a first colorant strength, and an emulsion of a non-thixotropic polymer. The second discontinuous phase includes a second colorant having a second colorant strength, a third rheology modifier, and an emulsion of a first thixotropic polymer.

21 Claims, No Drawings

(56) References Cited

OTHER PUBLICATIONS

Ashland Speciality Chemical, "Natrosol 250 H4BR Technical Datasheet," 2016, 1 pg.
DSM, "NeoCryl TX-200 Technical Datasheet," 2016, 1 pg.
DSM, "NeoCryl TX-203 Technical Datasheet," 2016, 1 pg.
DSM, "NeoCryl TX-208 Technical Datasheet," 1 pg.
Overbeek, AD et al., "New Generation Decorative Paint Technology," Progress in Organic Coatings 48, 2003, pp. 125-139.
Storme, P. "New hydrophobically modified acrylic technology to create cellulosics coatings rehology," Dow Coating Materials, European Coatings Web Conference, 2012, 21 pgs.
http:/www.pcimag.com/articles/85995-new-one-pack-crosslinking-polymers, "New One-Pack Crosslinking Polymers," 2001, 14 pgs.
Dow Chemical Company, "PRIMAL SF-021 Binder Acrylic Polymer for Self Film Forming Glass Paints Technical Data Sheet," 6 pgs.
Dow Chemical Company, "PRIMAL AC-2508E Technical Datasheet," 2016, 1 pg.
Aqualon, "NATROSOL Hydroxyethylcellulose A Nonionic Water-Soluble Polymer—Physical and Chemical Properties," 24 pgs.
Rohm and Haas, "RHOPLEX SG-10M 100% Acrylic Emulsion for Interior/Exterior Semigloss Latex Paints," 2007, 5 pgs.
Annable, T. et al., "Improvements in the Application Properties of Water-based Low VOC Coatings," Surface Coatings International, 1998 (7), pp. 321-329.
http://www.pcimag.com/articles/99209-instantaneous-interfacial-barrier-growth-stabilization-of-water-in-water-dispersions, "Instantaneous Interfacial Barrier Growth Stabilization of Water-in-Water Dispersions," 2017, 24 pgs.

\* cited by examiner

MULTI-COLOR PAINT: DIY EASY ROLLER APPLICATION FORMULATION BY THIXOTROPIC RESINS IN CONTINUOUS PHASE

TECHNICAL FIELD

In least one aspect, the present rejection is related multicolor paint compositions that can be applied by a roller.

BACKGROUND

Multicolor paint is a type of paint product that forms a paint coating that possesses multiple colors, typically, multiple color spots upon a light background color. Even though multicolor paint can be applied using various types of spraying, do-it-yourself (DIY) roller application is a big challenge. Currently available products in the market are very poor in DIY roller application properties such as good roll ability, uniform good coverage, spattering, color particle smearing, and the like.

Accordingly, there is a need for improved multicolor paint compositions that can be applied by a roller or other standard application techniques.

SUMMARY

The present invention solves one or more problems of the prior art by providing in at least one embodiment, a multicolor paint composition. The multicolor paint composition includes a continuous phase that includes water and a first rheology modifier that encapsulates discontinuous phases, a first discontinuous phase dispersed in the continuous phase, and a second discontinuous phase immiscibly dispersed in the continuous phase. The continuous phase can include an optional second rheology modifier that is different than the first rheology modifier. The first discontinuous phase includes a first colorant having a first colorant strength, and an emulsion of a non-thixotropic polymer or non-thixotropic copolymer. The second discontinuous phase includes a second colorant having a second colorant strength, an optional third rheology modifier, and an emulsion of a first thixotropic polymer.

In another embodiment, a multicolor paint composition is provided. The multicolor paint composition includes a continuous phase that includes water and a first rheology modifier that stabilizes and/or encapsulates discontinuous phases, a first discontinuous phase dispersed in the continuous phase, and a second discontinuous phase immiscibly dispersed in the continuous phase. The continuous phase can include an optional second rheology modifier that is different than the first rheology modifier. The first discontinuous phase includes a first colorant having a first colorant strength and an emulsion of a non-thixotropic polymer. The second discontinuous phase includes a second colorant having a second colorant strength, an optional third rheology modifier, and an emulsion of a first thixotropic polymer. The first colorant can be the same or different than the second colorant. Advantageously, the multicolor paint compositions set forth herein allow easy roller application, good coverage with acceptable roller loading frequency, improved resistance to particle smearing, improved particle orientation, and reduced roller spattering. Various embodiments of the multicolor paint composition improve the roller application by using thixotropic resins blended with an optional chelating agent in continuous base to improve finished multicolor paint pattern uniformity. The use of thixotropic resins build up thixotropic behavior and even out the spread of color droplets from roller covers.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. When one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this invention pertains.

"Colorant strength" or "color strength" is the ability of a pigment or colorant to impart color to other materials. Colorant or color strength can be quantified in any number of ways. For example, the concentration of a colorant or pigment to achieve a give depth of shade can be used as a measure of colorant or color strength. The lower the concentration of a pigment or colorant to achieve given depth of a shade, the greater is color strength. For some pigments or colorants, the higher the absorption coefficient, the higher the color strength.

The term "polymer" as used herein includes copolymers.

In an embodiment, a multicolor paint composition is provided. The multicolor composition is a water-in-water emulsion (e.g., a Pickering emulsion) having a first discontinuous aqueous phase (e.g., smearable discontinuous aqueous phase) and a second discontinuous aqueous phase (e.g., a thixotropic-containing discontinuous aqueous phase) dispersed in a continuous aqueous phase. The second discontinuous phase includes a first thixotropic polymer (including copolymers). Examples of thixotropic polymers includes, but are not limited to, Neocryl TX-208 or Neocryl TX-200. In this context, "a discontinuous aqueous phase" is a component dispersed in water in the form of droplets that do not dissolve into the water. The first discontinuous aqueous phase is formed from a first discontinuous aqueous composition, the second discontinuous aqueous composition, and the continuous aqueous composition. In a refinement, the first discontinuous aqueous phase and the second discontinuous aqueous phase (and therefore the associated compositions) are immiscible with each other. In a refinement, the first discontinuous phase is present in an amount of 2 to 40 weight percent of the total weight of the multicolor paint composition and the second discontinuous phase is present in an amount 2 to 40 weight percent of the total weight of the multicolor paint composition with the balance being the continuous phase. Characteristically, the first discontinuous phase includes a first plurality of droplets having a first average particle size and the second discontinuous phase includes a second plurality of droplets having a second average particle size. In a refinement, the second average particle size is greater than the first average particle size.

The continuous aqueous phase includes water and a number of additional optional components. In a refinement, the continuous aqueous phase includes a first rheology modifier that encapsulates and stabilizes discontinuous phases. Typically, the water is present in an amount of 30 to 80 weight percent of the total weight of the multicolor paint composition. The continuous aqueous phase can further include a second thixotropic polymer (e.g. Neocryl TX-208 or Neocryl TX-200) with a hydroxyl functional group and/or an emulsion thereof. In a refinement, the continuous aqueous phase includes a second rheology modifier. The second rheology modifier can be a crosslinking and/or chelating agent (e.g. Tytan CX100 which is a chelated titanium alkanolamine complex). Rheology modifiers such as Tytan CX100 react with colloid stabilized binders to form a thixotropic structure through shear sensitive hydrogen bonding. In a refinement, the first thixotropic polymer is the same as the second thixotropic polymer. In another refinement, the first thixotropic polymer is different than the second thixotropic polymer.

The first discontinuous aqueous phase and composition include a first pigment having a first colorant strength (referred to as Tint Base A) and a non-thixotropic polymer that is preferably an acrylic emulsion (e.g. RHOPLEX SG-10AF). Suitable non-thixotropic polymers include, but are not limited to, acrylic polymers, vinyl acrylic copolymers, ethylene-vinyl acetate copolymers, styrene-acrylic copolymers, polyvinyl alcohol, and combinations thereof. Suitable film forming polymers are formed from one or more monomers selected from the group consisting of methacrylate, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropyl acrylate, bis-(2,2,2-trifluoroethyl) itaconate, bis-(1,1,1,3,3,3-hexafluoroisopropyl), 1H, 1H,3H-hexafluorobutyl acrylate, 1H,1H, 7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-Heptadecafluorodecyl methacrylate 532.2 acrylic, 1H,1H,2H,2H-heptadecafluorodecyl acrylate, 1H,1H,5H-octafluoropentyl acrylate, 1H,1H,3H-tetrafluoropropyl methacrylate, hexafluoro-iso-propyl, 1H,1H,3H-hexafluorobutyl methacrylate, 1H,1H,5H-octafluoropentyl methacrylate, ethylene, propylene, 1-butylene, 2 butylene, vinyl acetate, and combinations thereof. In a refinement, the first discontinuous phase is capable of blending with the continuous phase when a force is applied to the multicolor paint composition.

The thixotropic polymers (i.e., first and/or second thixotropic polymers) and crosslinking/chelating agent provide thixotropic characteristics to the continuous aqueous phase, which improves the applicability of the multicolor paint composition. Also, the thixotropic polymers and crosslinking/chelating agent in the continuous aqueous phase improves the dispersion of the colored droplets, which significantly improves the color pattern uniformity when the multicolor paint composition is applied.

The continuous aqueous phase and the continuous aqueous composition include a first rheology modifier (e.g. LAPONITE® S482) that promotes stabilization and encapsulation of discontinuous phases. Moreover, these rheology modifiers form and support emulsions. Rheology modifiers such as LAPONITE® S482 form low viscosity pre-mixes in water. These premixes thicken on addition to the multicolor paint composition. The rheology modifier preferably enhances the immiscibility of the first discontinuous aqueous phase and the second discontinuous aqueous phase.

The second discontinuous aqueous phase and associated composition include a second pigment having a second colorant strength (referred to as Tint Base B, C, or D), a first thixotropic polymer (e.g. NEOCRYL® TX-208 or NEOCRYL® TX-200) with hydroxyl functional group(s) that is preferably an acrylic emulsion, and an optional third rheology modifier that can be a crosslinking and/or chelating agent (e.g. TYTAN® CX100). The third rheology modifier can be the same as the second rheology modifier set forth above. The first thixotropic polymer can include a colloid stabilizer that is capable of interacting with the second and/or third rheology modifier via hydrogen bonding. The first discontinuous aqueous phase and the elastic/shear resistant discontinuous aqueous phase are preferably in the form of droplets, where the average particle size of the first discontinuous aqueous phase is preferably smaller than the average particle size of the elastic/shear resistant discontinuous aqueous phase. The larger droplets of the second discontinuous aqueous phase can enhance elasticity and shear resistance.

Table 1 provides examples of weight percentages that can be used for the continuous phase, the first discontinuous phase, and the second discontinuous phase. Table 2. Description of the components in Table 1.

|  |  | Continuous Phase | Discontinuous Phase-First | Discontinuous Phase-Second |
|---|---|---|---|---|
| Defoamer | DREW ® T-4507 |  | 0.1-0.6 | 0.1-0.6 |
| Dispersant | TAMOL ® 731A |  | 0.2-1.2 | 0.2-1.2 |
|  | WATER | balance | balance | balance |
| Coalescent | VELATE ® 368 |  | 0.3-2 | 0.3-2 |
| Solvent | GLYCOL ETHER DPM | 0.1-2 |  |  |
| Thickener | NATROSOl ® 250 H4BR |  | 0.1-2 | 0.1-2 |
| Thickener | TT-935 | 0.05-2 |  |  |
| TiO2 | R746 SLURRY |  | 15-30 | 15-30 |
|  | Biocide | 0-2 | 0-2 | 0-2 |
| Surfactant | HYDROPALAt ® WE 3320 | 0.05-1 | 0.05-1 |  |
| Resin | RHOPLEX ® SG-10AF |  | 35.81 |  |
| Resin | NEOCRYL ® TX-200 | 20-40 |  | 20-40 |
| Clay | LAPONITE ® S482 | 2-12 |  |  |
| Chelating Agent | TYTAN ® CX100 |  | 0-1 | 0-2 |
|  | Total | 100 | 100 | 100 |

TABLE 2

Description of the components in Table 1.

| Compound | Description |
|---|---|
| DREW ® T-4507 | Foam Control Agent |
| TAMOL ® 731A | Scale Inhibitor |
| VELATE ® 368 | Coalescing agent |
| NATROSOL ® 250 H4BR | Water soluble hydroxyethylcellulose that is used as a viscosity and rheology modifier, protective colloid, water retention agent, stabilizer, and suspending agent, particularly in applications where a nonionic material is desired. |
| R746 SLURRY | multipurpose rutile titanium dioxide slurry of Ti-Pure ™ R-706, manufactured by the chloride process, that is designed to deliver both high gloss and excellent durability in coatings |
| Biocides | — |
| HYDROPALAT ® WE 3320 | APEO and VOC-free surfactant-suitable as wetting and dispersing agent |
| RHOPLEX ® SG-10AF | A non-thixotropic emulsion of an acrylic copolymer |
| RHOPLEX ® AC-2508 | Aqueous thixotropic emulsion of an acrylic copolymer |
| NEOCRYL ® TX-208 | Aqueous thixotropic emulsion of an acrylic copolymer |
| NEOCRYL ® TX-200 | Aqueous thixotropic emulsion of an acrylic copolymer |
| TYTAN ® CX100 | Rheology modifier for emulsion paints. Alkanolamine Titanate-CAS: 68784-47-4 |
| LAPONITE ® S482 | Synthetic Layered Silicate used as Rheology Modifier. Addition of Laponite S482 to formulations containing e.g. resins, surfactants or pigments, highly thixotropic gels are formed rapidly. |
| GLYCOL ETHER DPM | Evaporating Solvent |
| ENCOR ® 657 | Latex binder for acrylic high solids |
| Biocides | — |
| ACRYSOL ® DR-73 (P-65) | synthetic, liquid thickener |

In various embodiments of the present invention, the multicolor paint composition can also include a plurality of additional discontinuous aqueous phases dispersed in the continuous aqueous phase that are immiscible with each other and the first discontinuous aqueous phase. Typically, each additional discontinuous aqueous phase is a discontinuous elastic/shear resistant aqueous phase. In a refinement, each additional discontinuous phase includes an additional colorant having an associated colorant strength, an additional rheology modifier, and an emulsion of an additional thixotropic polymer.

As set forth above, the paint composition includes one or more pigments. Suitable colorants are azo dyes, phthalocyanine, anthraquinone dyes, titanium oxide, calcium carbonate, iron oxides (black, yellow and red), zinc oxide and carbon black, powdered metals, metal compounds (e.g., zinc phosphate), and combinations thereof. In a refinement, the colorant is present in an amount from about 0.1 to 10 weight percent of the total weight of the multicolor paint composition.

In some variations, the paint composition further includes one or more additives selected from the group consisting of rheology modifiers, surfactants, defoamers, organic solvents, pH adjusters, UV stabilizers, dispersants, coalescents, biocides, inorganic pigment, organic pigments, and combinations thereof. Typically, the additives are present in an amount from about 0.1 to 20 weight percent of the total weight of the multilayer paint composition.

The multicolor paint composition is formed by first forming several tint base compositions which are combined with a continuous base composition to form a colored tint composition. The each of the tint base compositions will include a colorant(s), titanium oxide, a polymer emulsion as set forth above, additives, and water. In a refinement, the tint base composition includes with respect to the total weight of the tint base composition, 0.1 to 10 weight percent colorant(s), 5 to 25 weight percent of a titanium oxide 20 to 50 weight percent of an emulsion, various additives in an amount of 0.1 to 20 weight percent, and the balance. For the first discontinuous aqueous phase (tint A base composition), the polymer emulsion includes a non-thixotropic polymer and a crosslinking agent. Typically, when present, the crosslinking agent is present in an amount of 0.01 to 1 weight percent of the total weight of the tint base composition. For the other tint bases, the polymer emulsion includes a thixotropic polymer as set forth above. Each of the continuous base compositions includes a latex binder, rheology modifier, various additives and water. In a refinement, the continuous base composition includes 10 to 40 percent latex binder, 2 to 8 weight percent rheology modifier, 0.1 to 20 weight percent various additives, and the balance water. The colored tint composition formed from tint base A is combined with one or more different colored tint compositions to form the multicolored paint composition.

The following examples illustrate the various embodiments of the present invention. Those skilled in the art will recognize many variations that are within the spirit of the present invention and scope of the claims.

Table 3 provides examples of the formulations (weight percent) of the invention. It should be appreciated that each of these components can be present in an amount of +/−25 percent of the listed value with water being the balance for each composition. In addition, colorants will be combined with the tint base compositions as set forth above to form colored tint base compositions. This colored tint base compositions can then be combined with the associated continuous base composition and then stirred to form droplets of the colored tint base compositions. The emulsified colored tint base compositions are then combined to form the multicolored paint composition which can have colored droplets of 2, 3, or more colors.

TABLE 3

Tint base A, B, C, D and continuous base formulations

| Description | Tint Base A Formula | Tint Base B Formula | Tint Base C Formula | Tint Base D Formula |
|---|---|---|---|---|
| Tint Base Compositions | | | | |
| WATER | 20.56 | 19.60 | 19.41 | 19.41 |
| DREW ® T-4507 | 0.17 | 0.17 | 0.17 | 0.17 |
| TAMOL ® 731A | 0.33 | 0.33 | 0.33 | 0.33 |
| VELATE ® 368 | 0.67 | 0.68 | 0.67 | 0.67 |
| NATROSOL ® 250 H4BR | 0.38 | 0.5 | 0.49 | 0.49 |
| R746 SLURRY | 11.78 | 11.89 | 11.78 | 11.78 |
| Biocides | 0.41 | 0.415 | 0.41 | 0.41 |
| HYDROPALAT ® WE 3320 | 0.11 | 0.11 | 0.11 | 0.11 |
| RHOPLEX ® SG-10AF | 19.2 | | | |
| RHOPLEX ® AC-2508 | | | | 20.17 |
| NEOCRYL ® TX-208 | | | 20.17 | |
| NEOCRYL ® TX-200 | | 19.39 | | |
| TYTAN ® CX100 | | 0.06 | 0.05 | 0.05 |
| Continuous Base Compositions | | | | |
| WATER | 31.01 | 31.32 | 31.01 | 31.01 |
| LAPONITE ® S482 | 3.17 | 3.21 | 3.18 | 3.18 |
| GLYCOL ETHER DPM | 0.38 | 0.39 | 0.38 | 0.38 |
| ENCOR ® 657 | 11.26 | 11.37 | 11.26 | 11.26 |
| Biocides | 0.41 | 0.415 | 0.41 | 0.41 |
| ACRYSOL ® DR-73 (P-65 | 0.16 | 0.17 | 0.16 | 0.16 |
| Percentage Total= | 100 | 100 | 100 | 100 |

Table 4 provides additional examples of the formulations (weight percent) of the invention. It should be appreciated that each of these components can be present in an amount of +/− 25 percent of the listed value with water being the balance for each composition.

| | | Continuous Phase | Discontinuous Phase-First | Discontinuous Phase-Second |
|---|---|---|---|---|
| Defoamer | DREW ® T-4507 | | 0.31 | 0.32 |
| Dispersant | TAMOL ® 731A | | 0.61 | 0.62 |
| | WATER | 62.25 | 38.36 | 36.89 |
| Coalescent | VELATE 368 | | 1.25 | 1.28 |
| Solvent | GLYCOL ETHER DPM | 0.84 | | |

-continued

|  |  | Continuous Phase | Discontinuous Phase-First | Discontinuous Phase-Second |
|---|---|---|---|---|
| Thickener | NATROSOL ® 250 H4BR |  | 0.72 | 0.94 |
| Thickener | TT-935 | 0.36 |  |  |
| TiO2 | R746 SLURRY |  | 21.97 | 22.38 |
|  | Biocide | 0.9 | 0.76 | 0.78 |
| Surfactant | Hydropalat ® WE 3320 |  | 0.2 | 0.21 |
| Resin | RHOPLEX ® SG-10AF |  | 35.81 |  |
| Resin | NEOCRYI ® TX-200 | 28.28 |  | 36.48 |
| Clay | LAPONITE ® S482 | 6.95 |  |  |
| Chelating Agent | TYTAN ® CX100 | 0.42 |  | 0.1 |
|  | Total | 100 | 100 | 100 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A multicolor paint composition comprising:
   a continuous phase including water, a first rheology modifier that encapsulates discontinuous phases, and a second rheology modifier that is a chelating agent;
   a first discontinuous phase dispersed in the continuous phase, the first discontinuous phase including a first colorant having a first colorant strength, and an emulsion of a non-thixotropic polymer; and
   a second discontinuous phase immiscibly dispersed in the continuous phase, the second discontinuous phase including a second colorant having a second colorant strength and an emulsion of a first thixotropic polymer having a hydroxyl functional group, wherein the first discontinuous phase and the second discontinuous phase are immiscible with each other.

2. The multicolor paint composition of claim 1, wherein the first discontinuous phase includes a first plurality of droplets having a first average particle size and the second discontinuous phase includes a second plurality of droplets having a second average particle size, the second average particle size being greater than the first average particle size.

3. The multicolor paint composition of claim 1 wherein the second colorant strength is greater than the first colorant strength.

4. The multicolor paint composition of claim 1 wherein the first thixotropic polymer has a colloid stabilizer.

5. The multicolor paint composition of claim 1 where the first discontinuous phase is capable of blending with the continuous phase when a force is applied to the multicolor paint composition.

6. The multicolor paint composition of claim 1 wherein the continuous phase includes a second emulsion of a second thixotropic polymer.

7. The multicolor paint composition of claim 6 wherein the first thixotropic polymer is the same as the second thixotropic polymer.

8. The multicolor paint composition of claim 6 wherein the first thixotropic polymer is different than the second thixotropic polymer.

9. The multicolor paint composition of claim 1 wherein the first discontinuous phase is present in an amount of 2 to 40 weight percent of the total weight of the multicolor paint composition, the second discontinuous phase is present in an amount 2 to 40 weight percent of the total weight of the multicolor paint composition with the balance being the continuous phase.

10. The multicolor paint composition of claim 1 further comprising one or more additional discontinuous phases immiscibly dispersed in the continuous phase, each additional discontinuous phase including an additional colorant having an associated colorant strength, an additional rheology modifier, and an emulsion of an additional thixotropic polymer.

11. The multicolor paint composition of claim 1 wherein the continuous phase further includes an agent that reacts with colloid stabilized binders to form a thixotropic structure through shear sensitive hydrogen bonding.

12. The multicolor paint composition of claim 1 wherein the chelating agent reacts with colloid stabilized binders to form a thixotropic structure through shear sensitive hydrogen bonding.

13. The multicolor paint composition of claim 1 wherein the second rheology modifier is a chelated titanium alkanolamine complex.

14. The multicolor paint composition of claim 1 wherein the second discontinuous phase further includes a third rheology modifier that is a chelating agent that reacts with colloid stabilized binders to form a thixotropic structure through shear sensitive hydrogen bonding.

15. A multicolor paint composition comprising:
   a continuous phase including water, a first rheology modifier, and a second rheology modifier that is a chelating agent;
   a first discontinuous phase dispersed in the continuous phase, the first discontinuous phase consisting of a first colorant having a first colorant strength, and an emulsion of a non-thixotropic polymer; and
   a second discontinuous phase immiscibly dispersed in the continuous phase, the second discontinuous phase including a second colorant having a second colorant strength, a third rheology modifier, and an emulsion of a first thixotropic polymer having a hydroxyl functional group, the first thixotropic polymer having a colloid stabilizer that interacts with the third rheology modifier via hydrogen bonding, wherein the second colorant strength is greater than the first colorant strength and wherein the first discontinuous phase and the second discontinuous phase are immiscible with each other.

16. The multicolor paint composition of claim 15, wherein the first discontinuous phase includes a first plurality of droplets having a first average particle size and the second discontinuous phase includes a second plurality of droplets having a second average particle size, the second average particle size being greater than the first average particle size.

17. The multicolor paint composition of claim 15 wherein the continuous phase includes a second emulsion of a second thixotropic polymer.

18. The multicolor paint composition of claim 15 wherein the first discontinuous phase is present in an amount of 2 to 40 weight percent of the total weight of the multicolor paint composition, the second discontinuous phase is present in an amount 2 to 40 weight percent of the total weight of the multicolor paint composition with the balance being the continuous phase.

19. The multicolor paint composition of claim 15 further comprising one or more additional discontinuous phases immiscibly dispersed in the continuous phase, each additional discontinuous phase including an additional colorant having an associated colorant strength, an additional rheology modifier, and an emulsion of an additional thixotropic polymer.

20. The multicolor paint composition of claim 15 wherein the third rheology modifier are each independently a crosslinking and/or chelating agent.

21. The multicolor paint composition of claim 15 wherein the third rheology modifier is a chelated titanium alkanolamine complex.

* * * * *